United States Patent
Santi (10) Patent No.: US 10,819,215 B2
(45) Date of Patent: Oct. 27, 2020

(54) BYPASS SWITCH FOR HIGH VOLTAGE DC SYSTEMS

(71) Applicant: University of South Carolina, Columbia, SC (US)

(72) Inventor: Enrico Santi, Columbia, SC (US)

(73) Assignee: University of South Carolina, Columbia, SC (US)

( * ) Notice: Subject to any disclaimer, the term of this patent is extended or adjusted under 35 U.S.C. 154(b) by 2 days.

(21) Appl. No.: 15/635,537

(22) Filed: Jun. 28, 2017

(65) Prior Publication Data

US 2018/0006548 A1    Jan. 4, 2018

Related U.S. Application Data

(60) Provisional application No. 62/356,822, filed on Jun. 30, 2016.

(51) Int. Cl.
*H02M 1/32* (2007.01)
*H02M 1/08* (2006.01)
(Continued)

(52) U.S. Cl.
CPC ............. *H02M 1/32* (2013.01); *H02M 1/08* (2013.01); *H02M 3/156* (2013.01); *H02M 2007/4835* (2013.01)

(58) Field of Classification Search
CPC .......... H02M 1/08; H02M 1/32; H02M 3/156; H02M 2007/4835; H01H 2071/124
(Continued)

(56) References Cited

U.S. PATENT DOCUMENTS 5,734,207 A * 3/1998 LeCourt ................. H01H 9/10
307/125
9,812,990 B1 * 11/2017 Cheng ............... H02M 7/53871
(Continued)

OTHER PUBLICATIONS

Sattar, Abdus. "Insulated gate bipolar transistor (IGBT) basics." IXYS Corporation. IXAN0063. 1998.

*Primary Examiner* — Emily P Pham
*Assistant Examiner* — Demetries A Gibson
(74) *Attorney, Agent, or Firm* — Dority & Manning, P.A.

(57) ABSTRACT

Many DC applications switching converter modules are multilevel, series connected converters. If an individual converter cell fails, it is desirable to be able to bypass the failed cell, in order to continue operating the rest of the converter. A bypass switch is provided as a hybrid switch, including a parallel combination of a slow mechanical switch with high current conduction capability and a low power semiconductor switch with faster acting switching capabilities. When the bypass switch is activated (closed), the low power semiconductor switch is turned on first and quickly establishes the bypass within 10 μs or less, to temporarily conduct required current until the slower mechanical switch turns on. The mechanical switch is subsequently turned on with zero voltage, given the parallel-connected semiconductor switch being on. If desired, the semiconductor switch can then be turned off with zero voltage, given the presence of the mechanical switch. When the bypass switch is deactivated (opened), the semiconductor switch can first be turned on to divert part of the current from the mechanical switch. The mechanical switch can then be turned off at low voltage, since the mechanical switch is shorted by the semiconductor switch. Once the mechanical switch is off, the semiconductor switch can be quickly turned off.

22 Claims, 3 Drawing Sheets

(51) Int. Cl.
*H02M 3/156* (2006.01)
*H02M 7/483* (2007.01)

(58) Field of Classification Search
USPC .................................................. 361/1–138
See application file for complete search history.

(56) References Cited

U.S. PATENT DOCUMENTS

| | | | |
|---|---|---|---|
| 2005/0270812 A1* | 12/2005 | Vinciarelli | H02M 3/157 363/65 |
| 2013/0082534 A1* | 4/2013 | Eckel | H02M 7/487 307/82 |
| 2013/0314948 A1* | 11/2013 | Perreault | H02M 7/497 363/8 |
| 2014/0002933 A1* | 1/2014 | Gao | H02H 3/085 361/18 |
| 2014/0146586 A1* | 5/2014 | Das | H02M 1/36 363/49 |
| 2014/0226374 A1* | 8/2014 | Hafneer | H02M 1/32 363/35 |
| 2015/0171628 A1* | 6/2015 | Ponec | H02J 1/00 307/77 |
| 2015/0171733 A1* | 6/2015 | Zargari | H02M 1/32 307/52 |
| 2015/0333660 A1* | 11/2015 | Kim | H02M 1/32 363/123 |
| 2016/0247641 A1* | 8/2016 | Malapelle | H02M 1/32 |
| 2017/0163170 A1* | 6/2017 | Tahata | H02M 1/32 |
| 2018/0302003 A1* | 10/2018 | Mori | H02M 7/12 |

\* cited by examiner

BYPASS SWITCH FOR HIGH VOLTAGE DC SYSTEMS

CROSS REFERENCE TO RELATED APPLICATION

This application claims filing benefit of U.S. Provisional Patent Application Ser. No. 62/356,822 having a filing date of Jun. 30, 2016, entitled "BYPASS SWITCH FOR HIGH VOLTAGE DC SYSTEMS" which is incorporated herein by reference and for all purposes.

STATEMENT REGARDING FEDERALLY SPONSORED RESEARCH OR DEVELOPMENT

The presently disclosed subject matter was made without government support.

BACKGROUND OF THE PRESENTLY DISCLOSED SUBJECT MATTER

The presently disclosed subject matter generally relates to a hybrid bypass switch, and in some instances, more particularly to a hybrid pass switch for high voltage DC systems.

In many DC applications switching converter modules are series connected to achieve higher voltage operation. Typical examples may be multilevel converters. If an individual converter cell fails, it would be desirable to be able to bypass it, so that the rest of the converter can still operate, even though possibly at a reduced power level. In other words, generally speaking, the idea of a bypass switch is that it would allow the operation of a multilevel converter to continue even if a cell fails.

In general, in some instances, relatively complex technology may be provided to address a changing power source output. For example, a static VAR compensator (SVC) (with VAR standing for volt amperes reactive) is a set of electrical devices for providing fast-acting reactive power on high-voltage electricity transmission networks. SVCs can be part of a flexible power transmission system, associated with regulating voltage, power factor, harmonics and stabilization of a system.

In the context of a DC application series-connected multilevel switching converter module, desirable features of a bypass switch for any one individual converter cell (in case of its failure) are fast closing speed, high current capability, low conduction loss, and long lifetime (that is, a large number of possible closures without deterioration). It is also understood that in some cases it would be desirable to not bypass (or to stop bypassing) an individual cell if it were operating normally, or if it resumed normal operations after a period of failure to operate properly or normally.

SUMMARY OF THE PRESENTLY DISCLOSED SUBJECT MATTER

In general, it is a present object to provide an improved hybrid bypass switch, and associated methodology. It is a more particular object, in some instances, to provide an improved hybrid pass switch for high voltage DC systems.

More broadly, it is a present object to provide improved bypass switch functionality, having a number of uses for potential bypass switching operations. In some instances, for example, it is an object to provide such improved functionality in conjunction with HVDC applications or in conjunction with DC power distribution systems.

Another present object is to more generally provide improved bypass switch technology (including apparatus and/or associated methodology) for an associated electrical module so that such electrical module can be alternately and selectively either engaged or bypassed relative to an electrical device (such as a circuit, or load, or other apparatus).

Still further, it is desired to provide an improved bypass switch and associated and/or related methodology, providing for relatively lower cost, higher performance, faster switching speeds, and/or lower conduction losses.

One presently disclosed exemplary embodiment relates to a hybrid switch such as preferably having a parallel combination of a relatively slower switching mechanical switch with high current conduction capability and a relatively lower power semiconductor switch that can temporarily conduct the required current until the mechanical switch turns on. For example, with such an arrangement, when the bypass switch is activated, the low power semiconductor switch may turn on and quickly establish a bypass, for example, within 10 µs or less. Such mechanical switch may be subsequently turned on with zero voltage, given the parallel-connected semiconductor switch being on. Such semiconductor switch can then be turned off with zero voltage, given the presence of the mechanical switch.

Another presently disclosed exemplary embodiment relates to a bypass switch for an associated electrical module which can be engaged or bypassed relative to an electrical device. Such exemplary switch preferably comprises a first switch terminal, for one parallel connection with an associated electrical module; a second switch terminal, for a second parallel connection with an associated electrical module; an electronic switch electrically connected in series between such first and second switch terminals; a mechanical switch electrically connected in series between such first and second switch terminals, and electrically in parallel with such electronic switch; and a control mechanism. Such control mechanism preferably provides for selective actuation of each of such electronic switch and such mechanical switch, to selectively control electrical bypass and engagement of an associated electrical module connected in series between such first and second switch terminals electrically in parallel with such bypass switch.

For some variations of such a bypass switch, such electronic switch may comprise a relatively low power, relatively fast switching semiconductor switch; such mechanical switch may comprise a relatively high current conduction capable mechanical switch; and such control mechanism may include (a) an electronic signal device connected with such semiconductor switch, and selectively providing control signals thereto for respectively closing and opening such semiconductor switch, and (b) a mechanical actuation control, physically connected with such mechanical switch, for selectively actuating such mechanical switch between either an open position or closed position thereof. For some such variations, such semiconductor switch may have a relatively faster switching time of no more than 10 µs; while such control mechanism, to electrically bypass an associated electrical module engaged with an electrical device, may actuate such bypass switch by first actuating such semiconductor switch to temporarily conduct required current. Further, for some instances, such control mechanism may subsequently actuate such mechanical switch after such semiconductor switch is actuated to temporarily conduct required current.

Per yet further variations of the foregoing exemplary bypass switch, such control mechanism may subsequently deactuate such semiconductor switch once such mechanical switch is turned on. Further, such control mechanism, to electrically engage a bypassed associated electrical module, may deactivate such bypass switch by first actuating such semiconductor switch to temporarily conduct required current. Per still further alternatives, in some instances, such control mechanism may subsequently deactivate such mechanical switch after such semiconductor switch is actuated to temporarily conduct required current, and subsequently deactivate such semiconductor switch once such mechanical switch is turned off.

For some variations of the foregoing exemplary bypass switch, an associated electrical module may comprise an individual converter cell of an electrical device comprising a multilevel, series connected switching converter module; such electronic switch may comprise a relatively low power semiconductor switch; and such mechanical switch may comprise a relatively high current conduction capable mechanical switch.

For some such variations, such semiconductor switch may comprise a current-bidirectional semiconductor switch. In some such instances, such current-bidirectional semiconductor switch may comprise two series-connected insulated-gate bipolar transistors with respective antiparallel diodes; and such control mechanism may include an electronic signal device connected with respective gate terminals of such transistors, and selectively providing control signals to such gate terminals. For others, such control mechanism may include a mechanical actuation control, physically connected with such mechanical switch, for selectively actuating such mechanical switch between either an open position or closed position thereof. Per some such variations, such mechanical actuation control may comprise a solenoid.

It is to be understood that the presently disclosed subject matter equally relates to associated and/or corresponding methodologies. One exemplary such method relates to methodology for operation of a bypass switch for an associated electrical module which can be engaged or bypassed relative to an electrical device, such methodology preferably comprising providing an electronic switch electrically connected in series between respective first and second switch terminals; providing a mechanical switch electrically connected in series between such first and second switch terminals, and electrically in parallel with such electronic switch; associating an electrical module electrically connected in parallel with such electronic switch and such mechanical switch; and selectively actuating each of such electronic switch and such mechanical switch, to selectively control electrical bypass and engagement of such associated electrical module.

Per some variations of such exemplary methodology, such associated electrical module may comprise an individual converter cell of an electrical device comprising a multilevel, series connected switching converter module; such electronic switch may comprise a relatively low power semiconductor switch having a relatively faster switching time of no more than 10 µs; such mechanical switch may comprise a relatively high current conduction capable mechanical switch; and such selectively actuating includes electrically bypassing such associated electrical module by first actuating such semiconductor switch to temporarily conduct required current, and subsequently actuating such mechanical switch after such semiconductor switch is actuated to temporarily conduct required current.

Per other variations thereof, such methodology may further include subsequently deactivating such semiconductor switch once such mechanical switch is turned on.

For yet other variations of such methodology, such associated electrical module may comprise an individual converter cell of an electrical device comprising a multilevel, series connected switching converter module; such electronic switch may comprise a relatively low power semiconductor switch having a relatively faster switching time of no more than 10 µs; such mechanical switch may comprise a relatively high current conduction capable mechanical switch; and such selectively actuating may include electrically engaging such associated electrical module when previously bypassed by first actuating such semiconductor switch to temporarily conduct required current, subsequently deactivating such mechanical switch after such semiconductor switch is actuated to temporarily conduct required current, and subsequently deactivating such semiconductor switch once such mechanical switch is turned off.

Yet another presently disclosed exemplary embodiment relates to a method for operation of a multilevel DC switching converter comprising plural series-connected individual converter cells in the event of an individual converter cell failure. Such method preferably comprises providing a hybrid bypass switch associated in parallel for each respective individual converter cell of the multilevel converter; operating each respective hybrid bypass switch to be closed so as to bypass its respective associated individual converter cell in the event of failure of such cell, in order to continue operating the rest of the converter; and operating each respective hybrid bypass switch to be opened so as to not bypass its respective associated individual converter cell during normal operation of such cell. Per such method, each respective hybrid bypass switch preferably comprises an electronic switch electrically connected in series between respective first and second switch terminals which are in parallel with the associated individual converter cell of the hybrid bypass switch, and comprises a mechanical switch electrically connected in series between the first and second switch terminals of such hybrid bypass switch, and electrically in parallel with the electronic switch of such hybrid bypass switch.

In some variations of such exemplary method, each hybrid bypass switch may comprise a parallel combination of a relatively slow mechanical switch with high current conduction capability and a low power semiconductor switch with relatively faster acting switching capabilities; and operating each respective hybrid bypass switch to be closed may comprise turning on its low power semiconductor switch first and relatively quickly to establish bypass for its associated individual converter cell and to temporarily conduct required current before its slower mechanical switch turns on, subsequently turning on its mechanical switch with zero voltage, then turning off its semiconductor switch with zero voltage due to turned on status of its mechanical switch.

For other variations thereof, operating each respective hybrid bypass switch to be opened may comprise turning on its low power semiconductor switch first and relatively quickly to divert part of the current from its mechanical switch before the slower mechanical switch turns off, subsequently turning off its mechanical switch at a relatively low voltage since such mechanical switch is shorted by its semiconductor switch, and then turning off its semiconductor switch quickly due to turned off status of the mechanical switch. Still for further alternative versions of the foregoing exemplary method, each hybrid bypass switch may comprise a parallel combination of a relatively slow mechanical switch with high current conduction capability and a low power semiconductor switch with relatively faster acting switching capabilities; and operating each respective hybrid bypass switch to be opened may comprise turning on its low power semiconductor switch first and relatively quickly to divert part of the current from its mechanical switch before the slower mechanical switch turns off, subsequently turning off its mechanical switch at a relatively low voltage since such mechanical switch is shorted by its semiconductor switch, and then turning off its semiconductor switch quickly due to turned off status of the mechanical switch.

For some variations, each electronic switch may comprise a relatively low power semiconductor switch having a relatively faster switching time of no more than 10 µs, and each mechanical switch may comprise a relatively high current conduction capable mechanical switch; and operating each respective hybrid bypass switch to be closed may comprise actuating its semiconductor switch to temporarily conduct required current, subsequently actuating its mechanical switch after its semiconductor switch is actuated to temporarily conduct required current, and subsequently deactuating its semiconductor switch once its mechanical switch is turned on. For some such variations, operating each respective hybrid bypass switch to be opened may comprise actuating its semiconductor switch to temporarily conduct required current, subsequently deactuating its mechanical switch after its semiconductor switch is actuated to temporarily conduct required current, and subsequently deactuating its semiconductor switch once its mechanical switch is turned off.

For yet some other variations of the foregoing, each electronic switch may comprise a relatively low power semiconductor switch having a relatively faster switching time of no more than 10 µs, and each mechanical switch comprises a relatively high current conduction capable mechanical switch; operating each respective hybrid bypass switch to be opened may comprise actuating its semiconductor switch to temporarily conduct required current, subsequently deactuating its mechanical switch after its semiconductor switch is actuated to temporarily conduct required current, and subsequently deactuating its semiconductor switch once its mechanical switch is turned off.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

In general, the presently disclosed subject matter is generally directed to a hybrid bypass switch. In some instances, the presently disclosed subject matter is more particularly concerned with a hybrid pass switch for high voltage DC systems.

Figure 1:
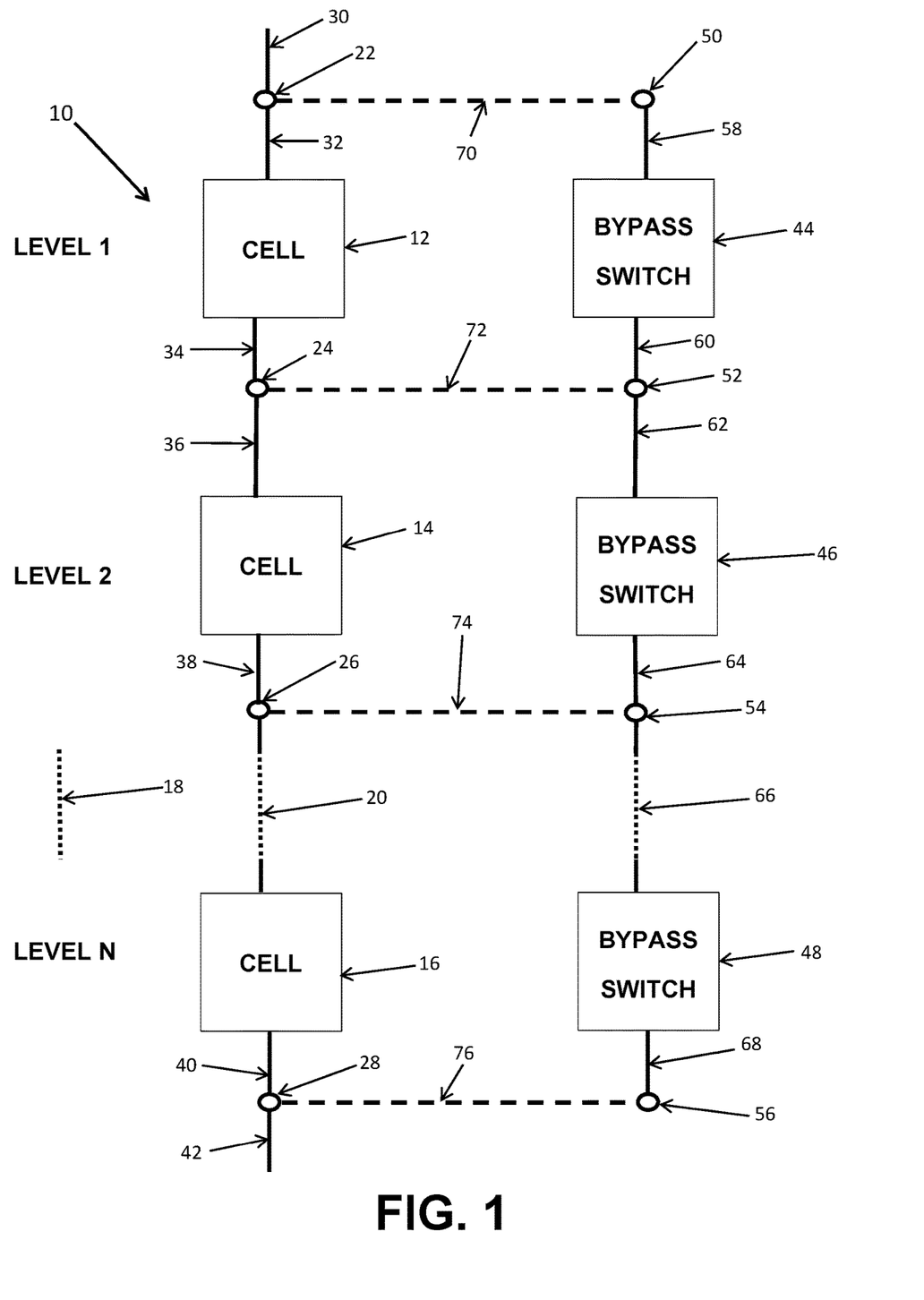
FIG. 1 is a block diagram representation of an exemplary embodiment of a multilevel (plural cell), series connected switching converter illustrated in combination with an exemplary embodiment of the presently disclosed bypass switch subject matter which may be practiced with such converter.

In many DC applications, switching converter modules are series-connected to achieve higher voltage operation. Typical examples are multi-level converters. FIG. 1 is a block diagram representation of an exemplary embodiment of a multilevel (plural cell), series connected switching converter generally 10. In the exemplary illustration, multiple cells 12, 14, and 16 represent respective levels, as will be understood by those of ordinary skill in the art, without detailed explanation. As shown, cell 12 corresponds with a first level, cell 14 corresponds with a second level, and cell 16 corresponds with an "N" level, which with dotted lines 18 and 20 represent that various converters 10 may have various levels, in accordance with different embodiments of the presently disclosed subject matter.

A representative pair of connection nodes or node points are shown in association with each respective cell. For example, nodes 22 and 24 are associated with cell 12, nodes 24 and 26 are associated with cell 14 and nodes 26 and 28 are associated with cell 16. Further, representative connection cables or wires 30 through 42 (details of which form no particular part of the presently disclosed subject matter) are variously associated with such nodes and cells, as illustrated in FIG. 1.

FIG. 1 also illustrates a representative combination of exemplary converter 10 with an exemplary embodiment of the presently disclosed bypass switch subject matter which may be practiced with such a converter. Specifically, if a converter cell such as 12, 14, or 16 fails, it is desirable to be able to bypass it, so that the rest of the converter 10 can still operate, even if in some instances at a reduced output (such as power level). Features of presently disclosed bypass switch subject matter include relatively fast closing speed, high current capability, low conduction loss, and longer lifetime (large number of possible closures without deterioration).

FIG. 1 represents how a respective presently disclosed bypass switch 44, 46, and 48 may be respectively associated with a representative cell 12, 14, and 16. Similar to such cells, each bypass switch may be associated with a pair of connection nodes or node points out of those represented by elements 50 through 56. However, those of ordinary skill in the art will understand that such representative nodes may not in fact be a separate physical node. For example, bypass switch 44 may be directly connected to nodes 22 and 24, rather than through respective representative nodes 50 and 52. For the sake of complete representation, paired connection cables or wires 58 through 68 are shown, as representing various interconnections which can selectively place a bypass switch in parallel with a representative cell. Connection cable 66 is shown in dotted line, consistent with the illustration of cable 20 and dotted line 18, to represent that plural respective levels of bypass switches may be matched with a corresponding number of plural respective levels of cells of converter 10. Furthermore, dashed lines 70 through 76 represent the interconnections which may be made between a given bypass switch and its associated converter cell, to form a parallel connection respectively between such cell/switch pairs.

Figure 2:
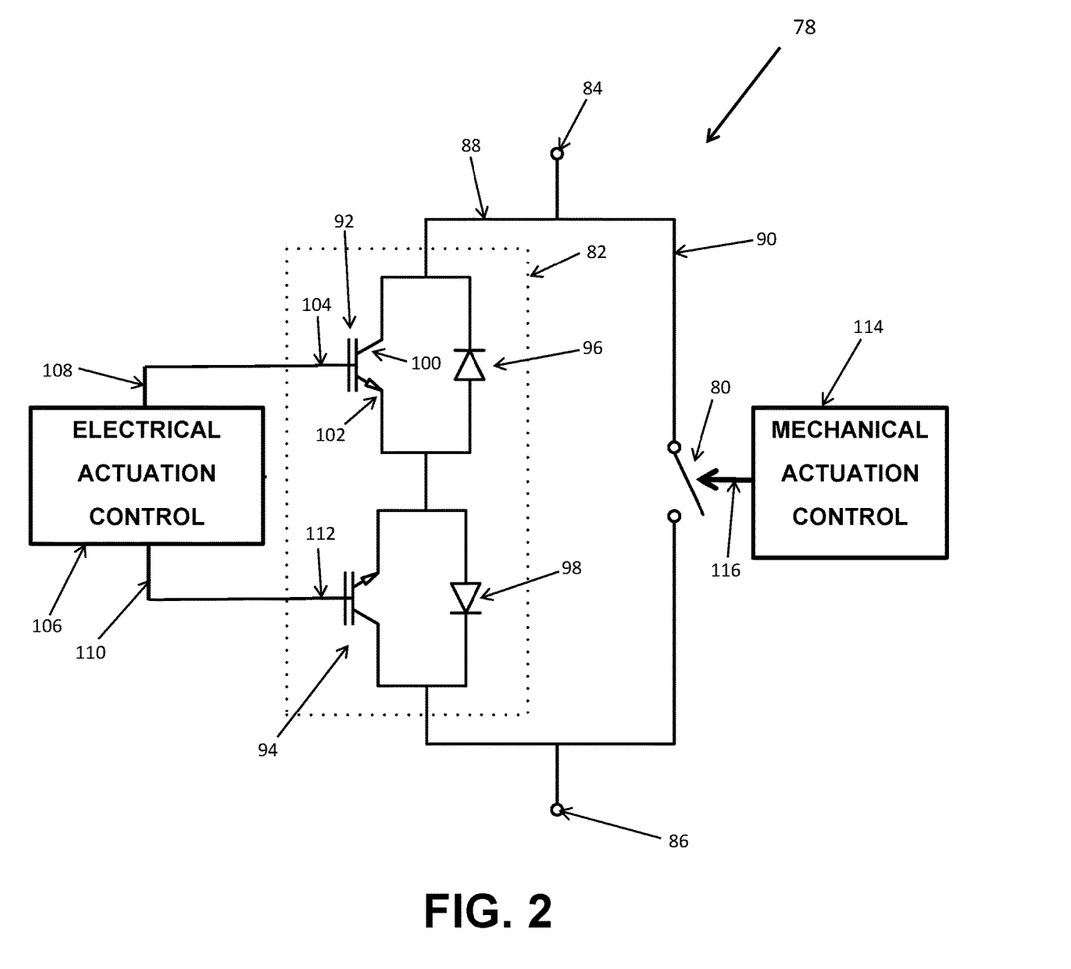
FIG. 2 is a schematic of an exemplary embodiment of the presently disclosed bypass switch subject matter.

FIG. 2 is a schematic of an exemplary embodiment of the presently disclosed bypass switch subject matter. As shown, the presently disclosed subject matter is a hybrid switch generally 78, preferably comprising a parallel combination of a relatively slow switching mechanical switch generally 80 with relatively higher current conduction capability and a relatively low-power semiconductor switch generally 82 that can temporarily conduct the required current until the mechanical switch 80 turns on. When the bypass switch 78 is activated, the low power semiconductor switch 82 turns on and quickly establishes the bypass. For some embodiments, such initial semiconductor switching may occur within 10 μs or less. The mechanical switch 80 may then be subsequently turned on with zero voltage, given the parallel-connected semiconductor switch 82 being on. The semiconductor switch 82 can then be turned off with zero voltage, given the presence of the closed mechanical switch 80 in the parallel connection between representative nodes 84 and 86.

It will be understood from the complete disclosure herewith that bypass switch 78 may be situated in an overall arrangement as that represented by present FIG. 1. For example, exemplary switch 78 between nodes 84 and 86 of FIG. 2 may correspond with representative bypass switch 44 between nodes 50 and 52 of FIG. 1. Likewise, switch 78 may correspond with any of switches 44, 46, or 48 of FIG. 1, and their respectively indicated relationships with representative converter cell levels or stages 12, 14, and 16.

In some instances, it may be of interest to be able to open the bypass switch 78. This can be readily accomplished by first turning on the semiconductor switch 82 in order to divert at least part of the current from the mechanical switch 80. As shown per FIG. 2, due to the parallel pathways represented by lines 88 and 90, when semiconductor switch 82 switches on, at least a part of the current previously flowing only in line 90 is now directed through line 88. The mechanical switch 80 can then be turned off at low voltage, since the mechanical switch 80 is in effect shorted by the semiconductor switch 82. Once the relatively slower acting mechanical switch 80 is off, the relatively faster switching semiconductor switch 82 can be quickly turned off.

In FIG. 2, the current-bidirectional semiconductor switch generally 82 is represented as an exemplary implementation using two series-connected IGBTs generally 92 and 94 with respective antiparallel diodes 96 and 98. As known to one of ordinary skill in the art, an IGBT is an insulated-gate bipolar transistor, which is a three-terminal power semiconductor device primarily used as an electronic switch which, which combines high efficiency and fast switching. Other implementations are possible, for example using MOSFETs, which have a built-in antiparallel diode, generally referenced as a so-called body diode. A power MOSFET is a specific type of metal oxide semiconductor field-effect transistor (MOSFET) designed to handle significant power levels. An IGBT cell is constructed similarly to a n-channel vertical construction power MOSFET except the n+ drain is replaced with a p+ collector layer, so that a vertical PNP bipolar junction transistor is formed. The IGBT combines the simple gate-drive characteristics of MOSFETs with the high-current and low-saturation-voltage capability of bipolar transistors. The IGBT combines an isolated-gate FET for the control input and a bipolar power transistor as a switch in a single device. Another possible implementation for the current bidirectional semiconductor switch utilizes two thyristors connected in anti-parallel. See FIG. 3. Thyristors are semi-controllable power semiconductor devices, in that they can be turned on using a gate signal, but cannot be turned off by acting on the gate signal. Thyristors latch on and turn off only if the thyristor current is brought to zero by other means. A thyristor solution provides bypass switch functionality, but the thyristors cannot be turned off by the gate. This solution is appropriate when subsequent opening of the hybrid switch is not required.

The insulated gate bipolar transistor is a three terminal, transconductance device that combines an insulated gate N-channel MOSFET input with a PNP bipolar transistor output connected in a type of Darlington configuration. As a result the terminals for representative device 92 are labeled as collector 100, emitter 102, and gate 104. Two of its terminals (collector 100 and emitter 102) are associated with the conductance path which passes current or not along line 88, while its third terminal (gate 104) controls the device.

Because the IGBT is a voltage-controlled device, it only requires a small voltage on the gate 104 to maintain conduction through the device. That is different from, for example, the case with a bipolar junction transistor (BJT), which is a semiconductor device constructed with three doped semiconductor regions (base, collector and emitter) separated by two p-n Junctions. In such instance, BJT's require that the base current is continuously supplied in a sufficient enough quantity to maintain saturation. With the more simple switching requirements of an IGBT, a block diagram illustration is provided in FIG. 2 of an electrical actuation control generally 106, which has respective outputs 108 and 110 respectively connected with gates 104 and 112 of respective IGBTs 92 and 94. Virtually any appropriate control 106 may be devised by one of ordinary skill in the art for producing necessary control signals on outputs 108 and 110 for controllably switching the state of devices 92 and 94 to switch semiconductor switch 82, without additional details herewith.

Also, as understood by those of ordinary skill in the art, an IGBT is a unidirectional device, meaning it can only switch current in the "forward direction", that is from its collector to its emitter. Such arrangement is unlike MOSFET's, which have bidirectional current switching capabilities (controlled in the forward direction and uncontrolled in the reverse direction). Therefore, selection for a particular embodiment of semiconductor switch 82 necessarily impacts the specific implementation of the associated electrical actuation control 106, as would be understood by those of ordinary skill in the art.

The control mechanism of the presently disclosed subject matter for bypass switch 78 also includes a mechanical actuation control aspect generally 114. As represented in FIG. 2 by line 116, such control 114 is physically connected with mechanical switch 80, for selectively actuating mechanical switch 80 between either an open position or closed position thereof. In other words, current is either allowed to flow (closed position for switch 80), or prevented from flowing (open position for switch 80) in the mechanical line 90 side of bypass switch 78. As will be understood, control 114 may be any appropriate device depending on the nature of the specific mechanical switch 80 used in a given embodiment of the presently disclosed subject matter. For example, in one presently disclosed exemplary embodiment, such mechanical actuation control 114 may comprise or make use of such as a solenoid, for physically changing a position of switch 80.

Generally speaking, the presently disclosed subject matter permits relatively low requirements on the respective two parallel switches. As understood from the complete disclosure herewith, mechanical switch generally 80 may be relatively slow acting because relatively fast turn-on speed is provided by the parallel semiconductor switch generally 82. At the same time, advantageously the semiconductor switch 82 can be relatively low power in its handling capabilities, because it only needs to conduct current for a relatively shorter period of time, until mechanical switch 80 turns on. Therefore, a relatively lower power semiconductor switch 82 can be used, as long as the maximum current is within the SCSOA (short circuit safe operating area) of the selected device. For example, the SCSOA current of a high-voltage IGBT can be 10-20 times larger than its continuous rated current. The conduction loss when the bypass switch 78 is closed is small, because it is equal to the loss in the mechanical switch 80.

Figure 3:
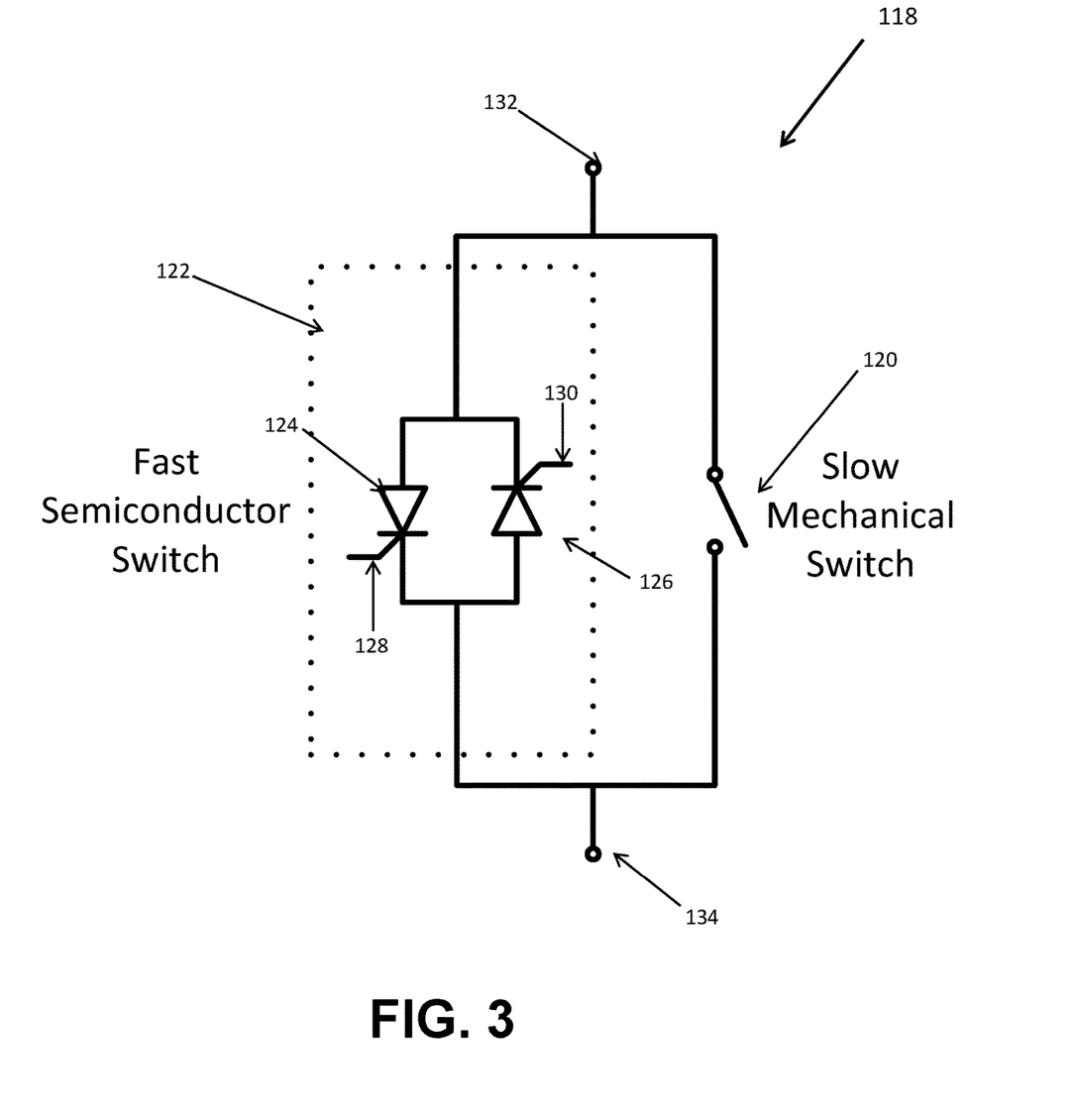
FIG. 3 is a schematic of another exemplary embodiment of the presently disclosed bypass switch subject matter.

FIG. 3 is a schematic of another exemplary embodiment of the presently disclosed bypass switch subject matter. As shown, the presently disclosed subject matter is a hybrid switch generally 118, preferably comprising a parallel combination of a relatively slow switching mechanical switch generally 120 with relatively higher current conduction capability and a relatively low-power faster acting semiconductor switch generally 122 that can temporarily conduct the required current until the mechanical switch 120 turns on. When the bypass switch 118 is activated, the low power semiconductor switch 122 turns on and quickly establishes the bypass. The two thyristors generally 124 and 126 connected in anti-parallel have respective gates generally 128 and 130, which are controlled as referenced above. Exemplary switch 118 between nodes 132 and 134 may correspond with representative exemplary switch 78 between nodes 84 and 86 of FIG. 2 and with representative bypass switch 44 between nodes 50 and 52 of FIG. 1.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the presently disclosed subject matter is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A bypass switch for an associated electrical module which can be engaged or bypassed relative to an electrical device, said bypass switch comprising,
    a first switch terminal, for one parallel connection with said electrical device;
    a second switch terminal, for a second parallel connection with said electrical device;
    an electronic switch, comprising a relatively low power semiconductor switch, electrically connected in series between said first and second switch terminals;
    a mechanical switch, comprising a relatively high current conduction capable mechanical switch, electrically connected in series between said first and second switch terminals, and electrically in parallel with said electronic switch; and
    a control mechanism for selective actuation of each of said electronic switch and said mechanical switch, to selectively control electrical bypass and engagement of said electrical device connected in series between said first and second switch terminals electrically in parallel with said bypass switch;
    wherein said electrical device comprises an individual converter cell of said electrical device comprising a multilevel, series connected switching converter module;
    said electronic switch comprises a relatively fast switching semiconductor switch; and
    said control mechanism includes:
        (a) an electronic signal device connected with said semiconductor switch, and selectively providing control signals thereto for respectively closing and opening said semiconductor switch, and
        (b) a mechanical actuation control, physically connected with said mechanical switch, for selectively actuating said mechanical switch between either an open position or closed position thereof;
    and further wherein said semiconductor switch has a relatively faster switching time of no more than 10 μs; and
    said control mechanism, to electrically bypass said electrical device, actuates said bypass switch by first actuating said semiconductor switch to temporarily conduct required current.

2. The bypass switch as in claim 1, wherein said control mechanism subsequently actuates said mechanical switch after said semiconductor switch is actuated to temporarily conduct required current.

3. The bypass switch as in claim 2, wherein said control mechanism subsequently deactuates said semiconductor switch once said mechanical switch is turned on.

4. The bypass switch as in claim 3, wherein said control mechanism, to electrically engage said bypassed associated electrical device, deactuates said bypass switch by first actuating said semiconductor switch to temporarily conduct required current.

5. The bypass switch as in claim 4, wherein said control mechanism subsequently deactuates said mechanical switch after said semiconductor switch is actuated to temporarily conduct required current, and subsequently deactuates said semiconductor switch once said mechanical switch is turned off.

6. The bypass switch as in claim 1, wherein said semiconductor switch comprises a current-bidirectional semiconductor switch.

7. The bypass switch as in claim 6, wherein:
said current-bidirectional semiconductor switch comprises two series-connected insulated-gate bipolar transistors with respective antiparallel diodes; and
said control mechanism includes an electronic signal device connected with respective gate terminals of said two series-connected insulated-gate bipolar transistors, and selectively providing control signals to said gate terminals.

8. The bypass switch as in claim 1, wherein said control mechanism includes a mechanical actuation control, physically connected with said mechanical switch, for selectively actuating said mechanical switch between either an open position or closed position thereof.

9. The bypass switch as in claim 8, wherein said mechanical actuation control comprises a solenoid.

10. The bypass switch as in claim 1, wherein:
said electronic switch comprises a thyristor-based switch; and
said control mechanism includes an electronic signal device connected for providing a control signal to a gate of said thyristor-based switch.

11. Method for operation of a bypass switch for an associated electrical module which can be engaged or bypassed relative to an electrical device, said methodology comprising,
providing an electronic switch electrically connected in series between respective first and second switch terminals;
providing a mechanical switch electrically connected in series between said first and second switch terminals, and electrically in parallel with said electronic switch;
providing an associated electrical module electrically connected in parallel with said electronic switch and said mechanical switch; and
selectively actuating each of said electronic switch and said mechanical switch, to selectively control electrical bypass and engagement of said associated electrical module;
wherein said associated electrical module comprises an individual converter cell of said electrical device comprising a multilevel, series connected switching converter module;
said electronic switch comprises a relatively low power semiconductor switch;
said mechanical switch comprises a relatively high current conduction capable mechanical switch;
said electronic switch has a relatively faster switching time of no more than 10 µs; and
said selectively actuating includes electrically bypassing said associated electrical module by first actuating said semiconductor switch to temporarily conduct required current, and subsequently actuating said mechanical switch after said semiconductor switch is actuated to temporarily conduct required current.

12. The method as in claim 11, further including subsequently deactuating said semiconductor switch once said mechanical switch is turned on.

13. The method as in claim 11, wherein
said selectively actuating includes electrically engaging said associated electrical module when previously bypassed by first actuating said semiconductor switch to temporarily conduct required current, subsequently deactuating said mechanical switch after said semiconductor switch is actuated to temporarily conduct required current, and subsequently deactuating said semiconductor switch once said mechanical switch is turned off.

14. The method as in claim 11, wherein said electronic switch comprises a relatively fast thyristor-based semiconductor switch.

15. A method for operation of a multilevel DC switching converter comprising plural series-connected individual converter cells in an event of an individual converter cell failure, comprising:
providing a hybrid bypass switch associated in parallel for each respective individual converter cell of the multilevel DC switching converter;
operating each respective hybrid bypass switch to be closed so as to bypass said respective individual converter cell in an event of failure of said respective individual converter cell, in order to continue operating a remainder of the converter; and
operating each of said respective hybrid bypass switch to be opened so as to not bypass said respective individual converter cell during normal operation of said respective individual converter cell;
wherein each of said respective hybrid bypass switch comprises an electronic switch electrically connected in series between respective first and second switch terminals which are in parallel with the associated individual converter cell of the hybrid bypass switch, and comprises a mechanical switch electrically connected in series between the first and second switch terminals of said hybrid bypass switch, and electrically in parallel with the electronic switch of said hybrid bypass switch; and
each said electronic switch comprises a relatively low power semiconductor switch has a relatively faster switching time of no more than 10 µs, and each said mechanical switch comprises a relatively high current conduction capable mechanical switch.

16. The method as in claim 15, wherein:
each of said respective hybrid bypass switch comprises a parallel combination of a relatively slow mechanical switch with high current conduction capability and a low power semiconductor switch with relatively faster acting switching capabilities; and
operating each of said respective hybrid bypass switch to be closed comprises turning on said low power semiconductor switch first and relatively quickly to establish bypass for said associated individual converter cell and to temporarily conduct required current before its slower mechanical switch turns on, subsequently turning on said mechanical switch with zero voltage, then turning off said semiconductor switch with zero voltage due to turned on status of said mechanical switch.

17. The method as in claim 16, wherein operating each of said respective hybrid bypass switch to be opened comprises turning on said low power semiconductor switch first and relatively quickly to divert part of the current from said mechanical switch before the slower mechanical switch turns off, subsequently turning off said mechanical switch at a relatively low voltage since said mechanical switch is shorted by said semiconductor switch, and then turning off said semiconductor switch quickly due to turned off status of the mechanical switch.

18. The method as in claim 15, wherein:
each of said respective hybrid bypass switch comprises a parallel combination of a relatively slow mechanical switch with high current conduction capability and a low power semiconductor switch with relatively faster acting switching capabilities; and
operating each of said respective hybrid bypass switch to be opened comprises turning on said low power semiconductor switch first and relatively quickly to divert part of a current from said mechanical switch before the slow mechanical switch turns off, subsequently turning off said mechanical switch at a relatively low voltage since said mechanical switch is shorted by said semiconductor switch, and then turning off said semiconductor switch quickly due to turned off status of the mechanical switch.

19. The method as in claim 15, wherein:
operating each of said respective hybrid bypass switch to be closed comprises actuating said semiconductor switch to said temporarily conduct of required current, subsequently actuating said mechanical switch after said semiconductor switch is actuated to said temporarily conduct of required current, and subsequently deactuating said semiconductor switch once said mechanical switch is turned on.

20. The method as in claim 19, wherein operating each of said respective hybrid bypass switch to be opened comprises actuating said semiconductor switch to said temporarily conduct of required current, subsequently deactuating said mechanical switch after said semiconductor switch is actuated to said temporarily conduct of required current, and subsequently deactuating said semiconductor switch once said mechanical switch is turned off.

21. The method as in claim 15, wherein:
operating each of said respective hybrid bypass switch to be opened comprises actuating said semiconductor switch to said temporarily conduct of required current, subsequently deactuating said mechanical switch after said semiconductor switch is actuated to said temporarily conduct of required current, and subsequently deactuating said semiconductor switch once said mechanical switch is turned off.

22. The method as in claim 15, wherein said electronic switch includes a pair of thyristors in anti-parallel connection.

* * * * *